United States Patent [19]

Roth et al.

[11] 4,299,883
[45] Nov. 10, 1981

[54] METHOD OF MAKING A SOUND-ABSORBENT MATERIAL, AND MATERIAL SO MADE

[76] Inventors: Jacques Roth, 13, quai Mullenheim, 67000 Strasbourg; Paul Seiler, 6, rue du Gue, 67400 Illkirch-Graffenstaden, both of France

[21] Appl. No.: 85,286

[22] Filed: Oct. 16, 1979

[30] Foreign Application Priority Data

Jan. 30, 1979 [FR] France .................................. 79 03394

[51] Int. Cl.³ .......................... B32B 5/18; B32B 7/00
[52] U.S. Cl. .................................. 428/332; 264/321; 428/315; 428/339; 428/423.1; 428/305; 521/901; 521/918
[58] Field of Search ............... 428/305, 315, 337, 339, 428/423.1; 264/321; 521/52, 50, 918, 901

[56] References Cited

U.S. PATENT DOCUMENTS

| | | | |
|---|---|---|---|
| 3,060,137 | 10/1962 | Gemeinhardt et al. | 264/321 |
| 3,159,700 | 12/1964 | Nakamura | 264/321 |
| 3,196,975 | 7/1965 | Voelker | 264/321 |
| 3,386,877 | 6/1968 | Skochdopole et al. | 264/321 |
| 3,405,217 | 10/1968 | Garrett et al. | 521/52 |
| 3,647,609 | 3/1972 | Cyba | 428/315 |
| 3,816,233 | 6/1974 | Powers | 428/315 |
| 3,978,266 | 8/1976 | Lock | 428/315 |
| 4,078,959 | 3/1978 | Palfey et al. | 264/321 |
| 4,084,030 | 4/1978 | Goodale et al. | 428/315 |
| 4,105,738 | 8/1978 | Rohn | 264/321 |
| 4,131,702 | 12/1978 | Alfter et al. | 428/314 |

FOREIGN PATENT DOCUMENTS

| | | |
|---|---|---|
| 2148035 | 3/1973 | France . |
| 1147483 | 4/1969 | United Kingdom . |
| 1375877 | 11/1974 | United Kingdom ............... 428/313 |

*Primary Examiner*—William J. Van Balen
*Attorney, Agent, or Firm*—Young & Thompson

[57] ABSTRACT

A sound-absorbent material is made by compressing foamed synthetic plastics material so as to rupture the walls of at least some of the cells therein. Preferably a slab of polycarbodiimide foam is compressed to about 50% to 66% of its initial thickness while cold or at a temperature below 120° C., and is moulded to shape while below 120° C., being bonded if desired to one or more sheets of covering or strengthening or decorative fabric or felt or other facing material.

6 Claims, 5 Drawing Figures

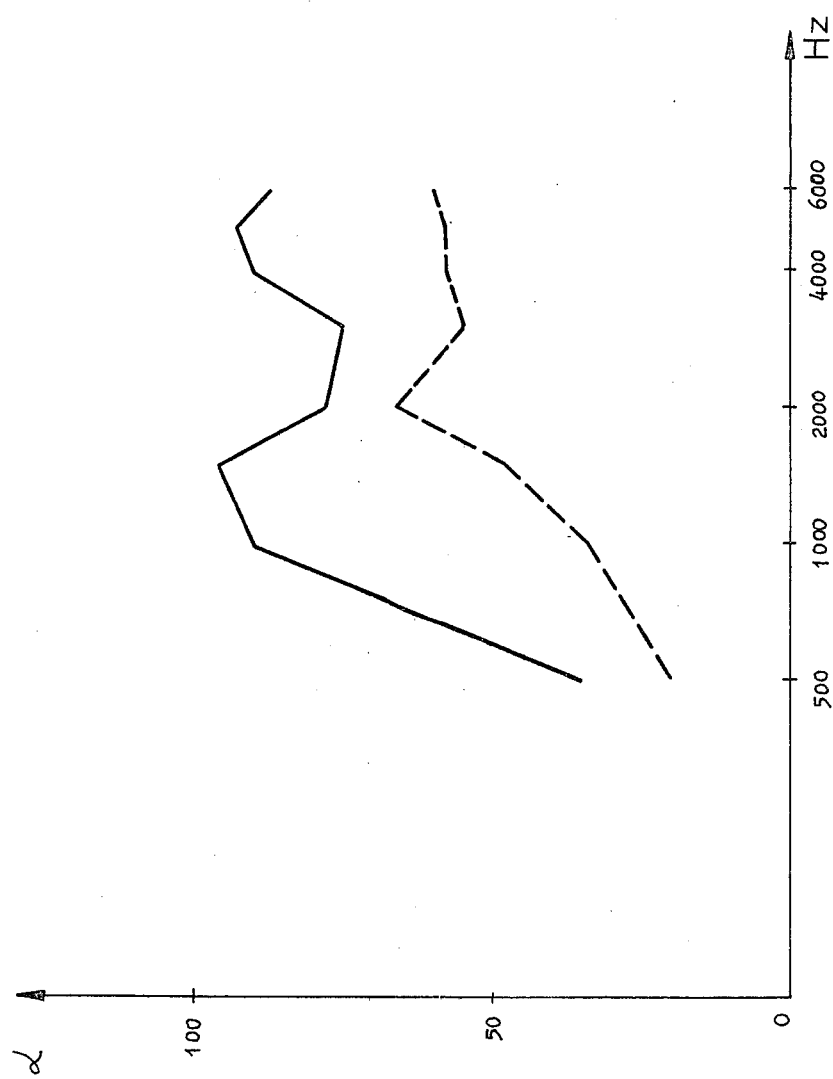

METHOD OF MAKING A SOUND-ABSORBENT MATERIAL, AND MATERIAL SO MADE

INTRODUCTION AND BACKGROUND OF THE INVENTION

The present invention is concerned with the field of the manufacture of sound-absorbent materials, and has for its object a method for the manufacture of such a material.

The invention also has for object the material obtained by application of this method.

Sound-absorbent materials have for their purpose, especially in the fields of building and automobiles, the maximum absorption of sound waves travelling in the premises or dwellings.

In fact in premises or dwellings the walls of which are not lined with any sound-absorbent material, the sound waves are reflected by the said walls and inconvenience the occupants. Thus it is necessary to line the walls with such materials which more or less effectively absorb the sound waves in order to render the atmosphere of the premises or dwelling more padded and more agreeable.

In order to obtain sound-absorption at present either jute felts or sheets of natural or synthetic fibres are used, where the fibers are interlaced and possibly connected by phenol resins, or equally there are used synthetic material foams having open and communicating cells.

However the jute felts and the sheets of interlaced natural or synthetic fibres are frequently presented in the form of very fragile sheets which can be used only as lining papers or flat surfaces, their positioning further requiring qualified personnel.

Sheets of interlaced synthetic and natural fibres connected by phenol resins can be shaped by hot compression. However they are very hydrophilic and therefore cannot be used in contact with metal and a source of humidity, which is frequently the case in automobiles, especially as roof edgings and in the hood. In fact the humidity absorbed by the material stagnates and causes rusting of the metal, while diminishing the qualities of sound-absorption.

Furthermore these sheets lose a large part of their sound-absorption capacities when they are shaped by hot compression, and are heavy after the said shaping.

Synthetic cellular material foams in the form of polyurethane foam, polyvinylchloride foam of polycarbodiimide foam generally have a poor capacity for sound absorption. Moreover polycarbodiimide foam is very friable and thus difficult to utilise.

BRIEF SUMMARY OF THE INVENTION

The present invention has the purpose of reducing these drawbacks.

It has in fact for its object the provision of a method for the manufacture of a sound-absorbent material which consists in fundamentally modifying the cellular structure of a synthetic foam by compression of a slab of foam between the rollers or plates of a press in order to cause a modification of the form of the cells and fractures and ruptures of the structural members of these cells, which effect is obtained by a reduction preferably of 50% of the initial thickness of the slab.

FURTHER DESCRIPTION AND ADVANTAGES OF THE INVENTION

In accordance with one variant of embodiment the compression of the foam slab is regulated by limitation in such manner as to form a multi-layer slab having two external layers with ruptured cells and a middle layer with intact cells, which effect is obtained by a reduction, preferably, to 66% of the initial thickness of the slab.

In accordance with one characteristic of the invention the compression is preferably carried out in the cold state or at a temperature below 120° C.

The invention also relates to a sound-absorbent material constituted by a slab of synthetic foam preferably compressed to 50% of its initial thickness and having modified cells, also fractures and ruptures of the structural members of the said cells.

In accordance with one variant of embodiment of the invention the sound-absorbent material is constituted by a slab of synthetic foam preferably compressed to two-thirds of its initial thickness and having two external layers with ruptured cells and a middle layer with intact cells.

The invention will be better understood by means of the following description which relates to preferred forms of embodiment given by way of non-limitative examples and explained with reference to the accompanying diagrammatic drawings.

BRIEF DESCRIPTIONS OF THE VIEWS IN THE DRAWINGS

Figure 2:
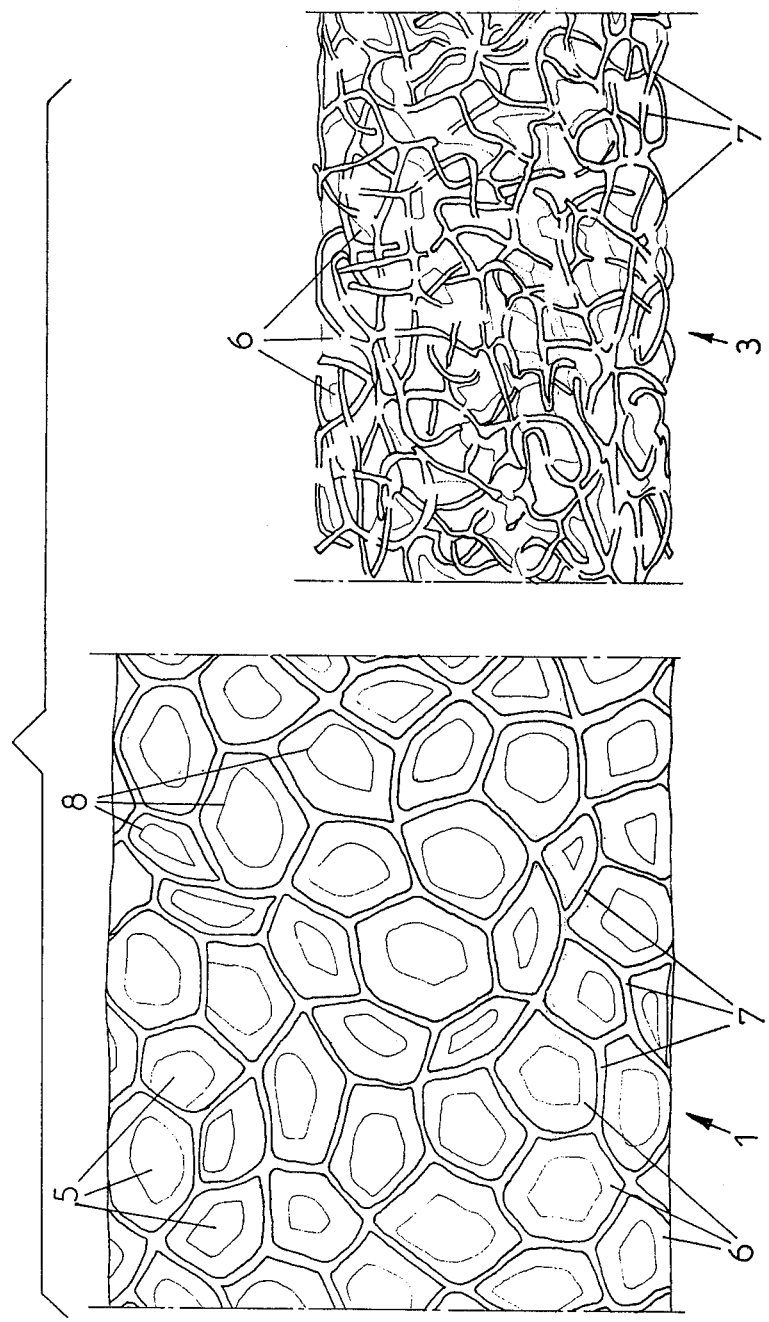
FIG. 2 is a greatly enlarged sectional view of a part of a slab before and after application of the method according to the invention.
Figure 3:
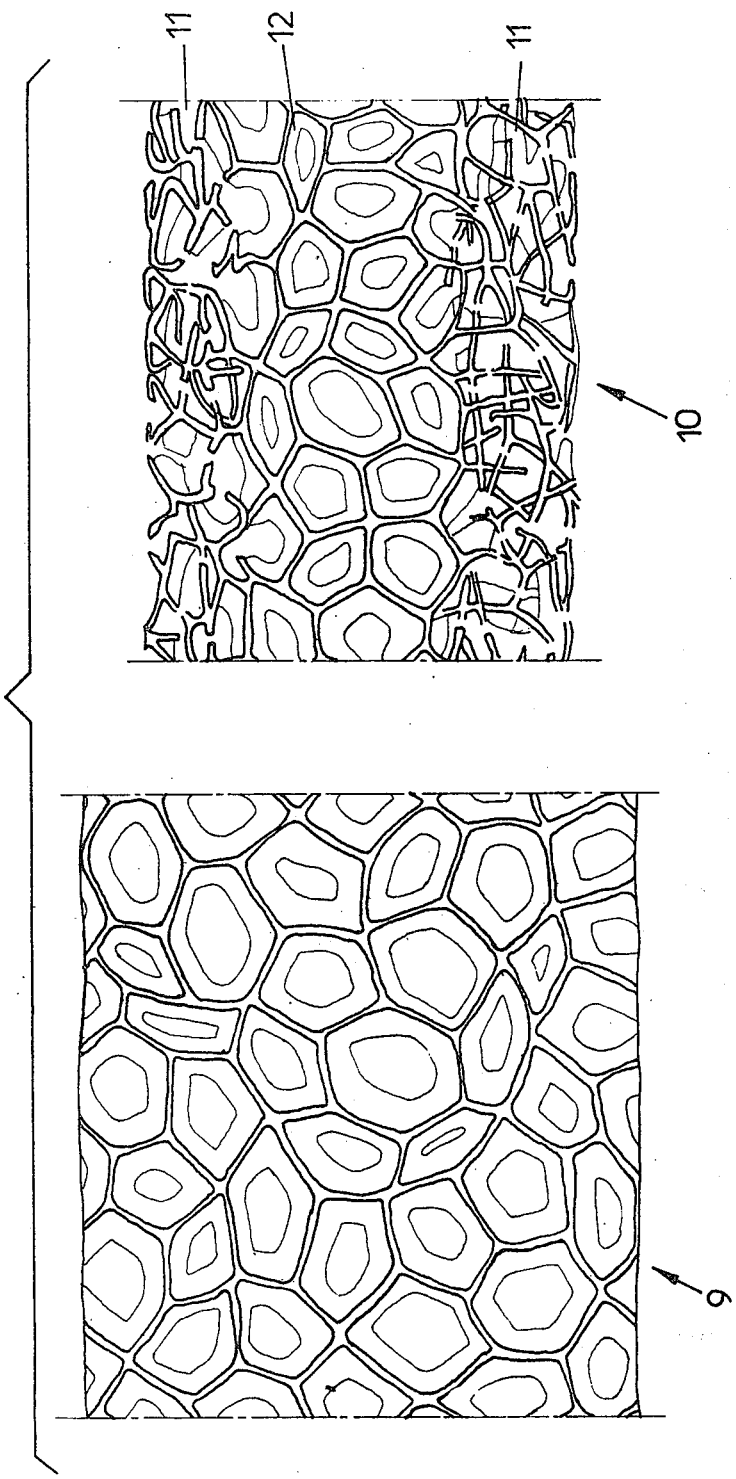
Figure 4:
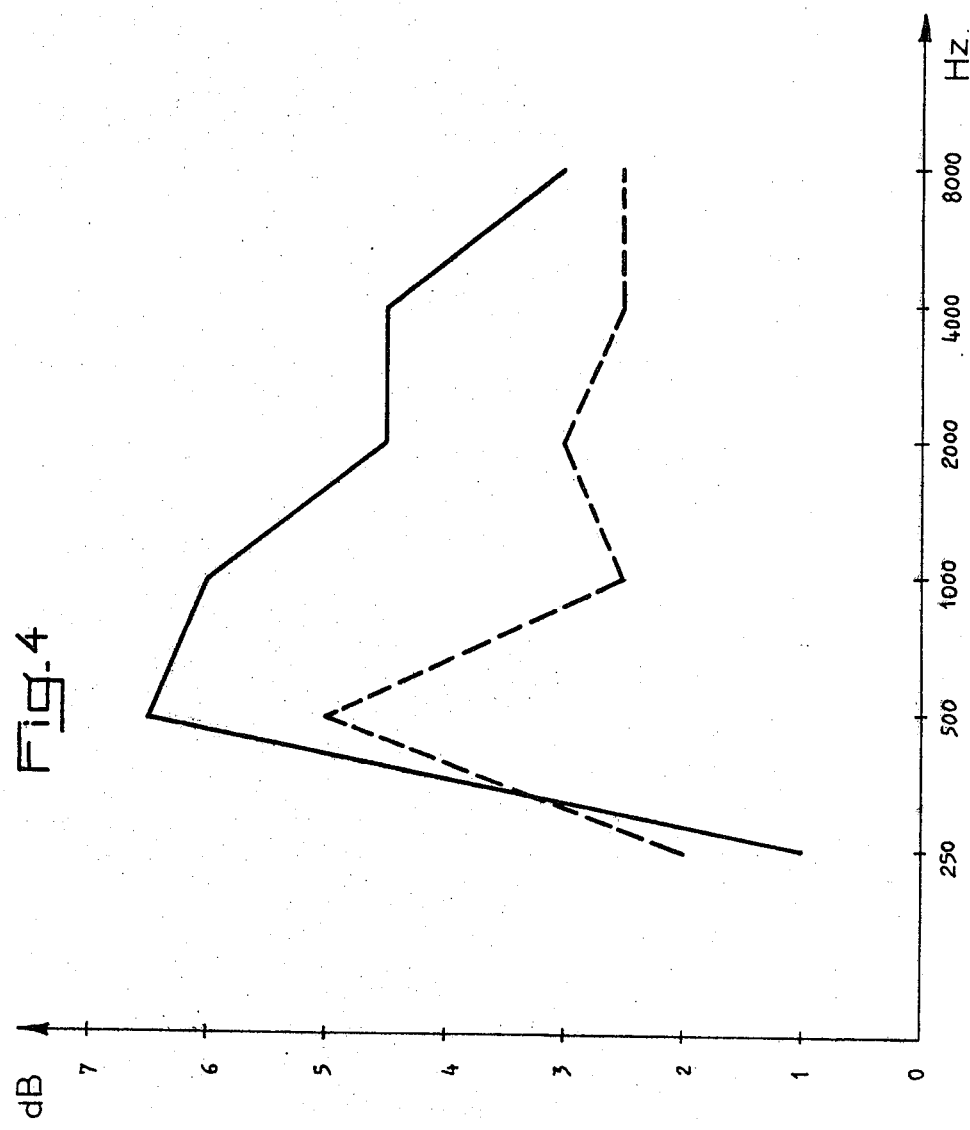

FIG. 3 is a sectional view similar to that in FIG. 2 of a variant of embodiment of a sound-absorbent material according to the invention, and FIGS. 4 and 5 are comparative curves of the sound-absorption of a slab of polycarbodiimide foam before and after its treatment according to the method of the invention, the measurements being effected respectively in a metallic measurement box and by means of a Kundt's tube.

DETAILED DESCRIPTION OF THE PREFERRED EMBODIMENTS

Figure 1:
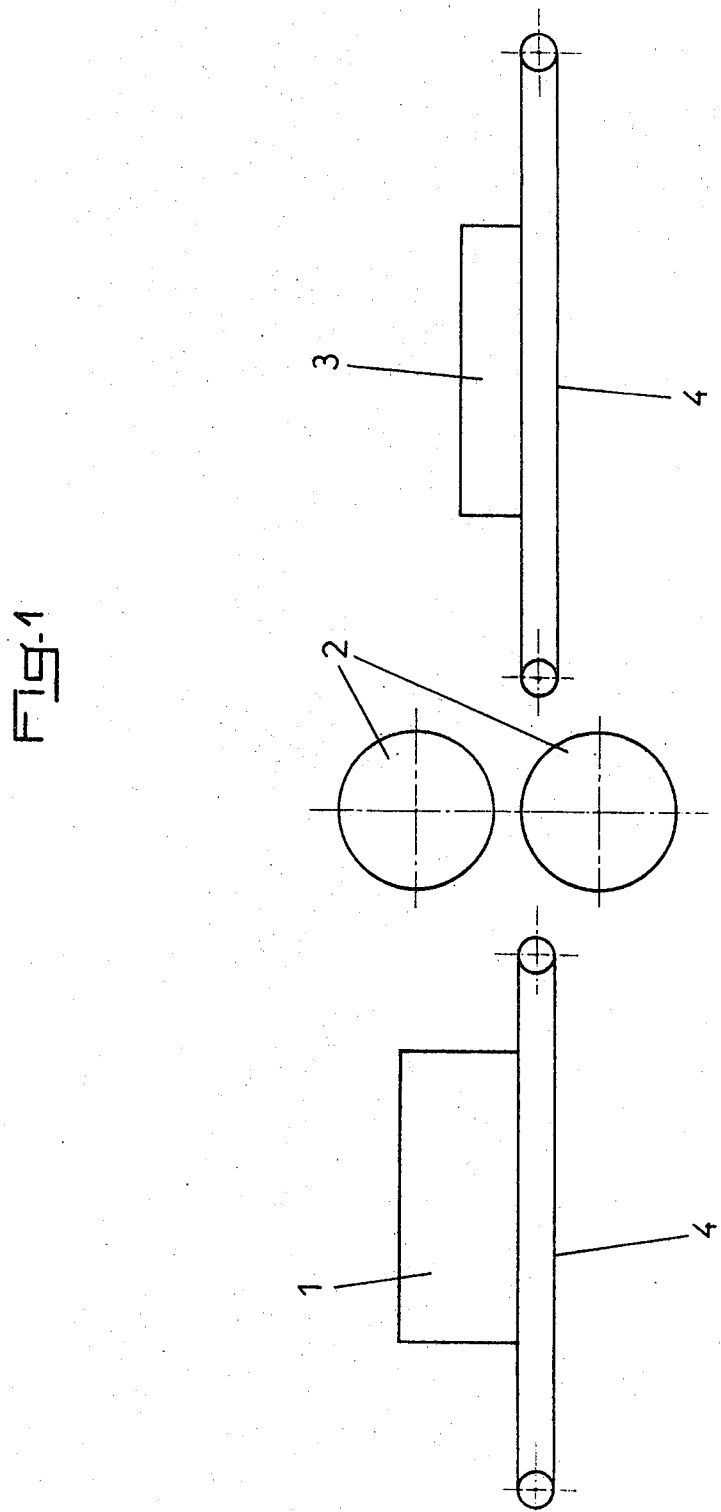
FIG. 1 is a sectional view showing the manufacturing method according to the invention.

In accordance with the invention and as shown more particularly by way of example by FIG. 1 of the accompanying drawings, the method for the manufacture of a sound-absorbent material consists essentially in fundamentally modifying the cellular structure of a polycarbodiimide foam by compression of a slab 1 of this foam between rollers 2 in order to transform this slab 1 into a slab 3 the thickness of which is equal to 50% of that of the slab 1, by virtue of a modification of the form of the cells and of fractures and ruptures of the structural members of the said cells.

The feed of the slab 1 between the rollers 2 and the removal of the slab 3 obtained at the exit from the rollers are carried out in known manner by means of conveyor belts 4.

the compression of the slab 1, which could equally be effected between the plates of a press, is preferably always effected in the cold state, or in any case at a temperature below 120° C.

FIG. 2 represents a part of the slabs 1 and 3 in greatly enlarged section. The cells 5 of the slab 1 are composed of a skeleton partially lined with films 6 constituting the walls of the cells 5 and provided by the surface included between the structure members 7 of the cells 5 and the line 8. The cellular skeleton is presented in the form of a more or less regular honeycomb. By reason of the presence of the films 6 such a skeleton thus constitutes practically closed cells having resonance characteristics and not sound-absorption characteristics.

By reason of the compression exerted upon the slab 1 to transform it into the slab 3, the structural members 7 are partially ruptured, especially at their intersections, and therefore the films 6 are unstressed and relaxed. Thus a significant proportion of the films 6 and the structural members 7 of the skeleton is "unattached", that is to say they are no more than partially interconnected, and an entanglement of structural members and partially free films is created, so that the resonance characteristics inherent in the partially or completely closed cells are lost. This new constitution of the cells of the slab 3 permits much more absorption of sound waves, by setting of the skeleton and the films in vibration and by active absorption due to the new geometry of the open and communicating cells.

The compression further has the effect of bringing the diaphragms and films of the skeleton closer to one another in such manner as to form a foam of more compact structure, analogous with a felt structure. This compacting of the foam likewise has the effect of absorbing the sound waves by viscous friction.

The modification of the cellular structure permits a transformation of the foam, which was friable, into a flexible and resilient foam, this resilience increasing with the original density and with the degree of compression.

The temperature of compression must be below 120° C. in order to avoid the formation, by thermoplastification, of a cell condensation which would have the effect of forming a crust opposing the penetration of the sound waves, which would then be reflected, contrarily to the purpose of the invention.

In accordance with a variant of embodiment of the invention it is likewise possible to effect limiting regulation of the compression in order to produce a multilayer cellular structure, for example a slab in three distinct layers. For this purpose for example a slab 9 is compressed to two-thirds of its initial thickness in order to obtain a slab 10 having two identical external layers 11 with crushed cells and a middle layer 12 with intact cells (FIG. 3).

This manner of production of a multi-layer slab permits further improvement of the sound-absorption in certain frequency zones.

The utilised slabs of polycarbodiimide foam are obtained by cutting out by means of horizontal or vertical saws from blocks of polycarbodiimide foam, which are produced by casting of a foaming mixture in a box or on a moving belt, the mixture expanding and polymerising to form the blocks.

This polycarbodiimide foam is manufactured especially in densities 16 and 19, the respective foaming mixtures being constituted by:

For density 16:
100 parts by weight of methyl phenyl diisocyanate, such as the product known under the commerical name Bayer 44 V 20 and 44 V 40,
4 to 6 parts by weighty of diphenylcresylphosphate, which serves as fireproofing agent,
4 to 6 parts by weight of dimerisation activator, such as the product known under the commerical name Bayer PU 1835;

For density 19:
100 parts by weight of methyl phenyl diisocyanate, such as the product known under the commerical name Bayer 44 V 20 and 44 V 40,
4 to 6 parts by weight of a fireproofing and plasticising agent, such as the product known under the commerical name Bayer PU 1878,
4 to 6 parts by weight of a dimerisation activator such as the product known under the commerical name Bayer PU 1835.

Such a foam possesses the following characteristics:
water-repellence,
a structure with slightly open and communicating cells,
rigidity and great friability,
fireproof classification,
quite slight sound absorption,
presentation in slabs obtained from blocks.

By virtue of the new cellular structure obtained by application of the method according to the invention, the new characteristics of the foam are as follows:
resilient and non-friable foam,
excellent sound absorption,
presentation in slabs or shaped pieces with retention of the fireproof and water-repellent characteristics.

In the case of compression of a slab of polycarbodiimide foam by means of a roller machine, these rollers can for example have a diameter of 20 cm. and can be driven at a rotation speed synchronised with that of the moving belts, of the order of 15 to 20 m/minute.

For the obtaining of a slab of 20 mm. thickness starting from a slab of 40 mm. and density 16, the spacing between the rollers will be 7 to 8 mm., while it will be 4 to 5 mm. for slabs of the same thickness but of density 19.

For the obtaining of multi-layer slabs of 20 mm. final thickness, one starts with basic slabs of a thickness of 30 mm. and the spacing between the rollers is regulated respectively to 14 and 16 mm. for foams of density 19 and 16, and for an intact middle layer of 10 mm.

Finally in order to avoid all arching of the foam slabs under the action of the rollers, and for the obtaining of an unstressed, uniform and regular effect over the whole surface of the slabs, and thus over all the cells, each slab is advantageously passed twice between the rollers in a to and fro movement. Such a method in fact permits the nip of the rollers to act in the two longitudinal directions of the slabs and thus provides a better distribution of the ruptures of the structural members of the cellular skeleton and of the films.

The sound-absorbent material according to the invention can be hot-shaped in a press, it being ensured however that the temperature of the ram and die applied to the foam should be below 120° C., in order to avoid any formation of a surface crust by thermoplastification, which would be detrimental to the sound-absorption qualities.

This material has been subjected to two types of tests to verify its sound-absorption capacity. In a first operation it was subjected to effects in a standardised metallic vacuum box. A sample of the material was then introduced into the said box and tested. The graph in FIG. 4 gives the recorded decibel gains. In this graph there are indicated:

As abscissae: the frequencies from 250 to 8000 Hz, at which the recorded decibels were observed, and
as ordinates: the decibel gains obtained on the one hand upon introduction of a polycarbodiimide foam slab of density 19 and thickness 40 mm, untreated (in dot-and-dash lines) and on the other hand upon the introduction of an analogous slab compressed in accordance with an example of the invention to 20 mm. thickness (in solid lines). This graph shows, in particular at the frequencies between 500 and 5000 Hz the very clear superiority of the treated foam over the normal foam, this superiority being particularly marked at 1000 Hz, in which case the gain is 3.5 decibels, while the initial sound level was 70 to 80 decibels according to frequencies.

Further tests were carried out according to the Kundt's tube method. For this purpose a sample of ordinary foam of density 19 and thickness 40 mm. and then a sample of the same foam when treated and compressed to 20 mm. were tested in succession.

The results obtained are represented in the graph in FIG. 5, which indicates as abscissae the frequencies at which the absorption is recorded and as ordinated the coefficient of sound absorption expressed in $\alpha$ by the Kundt's tube. The dotted line curve represents the sound absorption in $\alpha$ of the ordinary foam while the solid line curve represents the absorption of the treated foam. According to this graph it is noted that the coefficient $\alpha$ of the treated foam is consistently greatly superior to that of the ordinary foam between 500 and 6000 Hz, this difference being particularly noticeable at 1000 Hz, in which case the coefficients of the ordinary foam and of the treated foam are respectively 34 $\alpha$ and 90 $\alpha$, that is practically a ratio of 1 to 3.

The material according to the invention can be integrated into composite articles such as automobile roofs or the like, the treated foam slab being secured to a corrugated cardboard support or a support of thermomouldable polyurethane foam and/or with a decorative material such as a fabric, a non-woven material, a PVC, etc.

Thus this material can be used in slabs or moulded pieces and its water-repellence permits application to metallic supports without fear of deterioration of the latter by humidity. Particularly interesting applications of the material are in the field of the construction of vehicles, boats and aircraft, and in building.

Finally according to a further characteristic of the invention the foam slab can be a slab of polyurethane foam, polyurea foam, phenol foam or any other synthetic foam, the cellular structure of which permits of obtaining, by compression, sound-absorption capacities analogous with those of polycarbodiimide foam.

The invention is not of course limited to the forms of embodiment as described and as represented in the accompanying drawings. Modifications remain possible, especially from the viewpoint of the apparatus for carrying out the methods, without thereby departing from the scope of protection of the invention.

What is claimed is:

1. A method for the manufacture of a sound-absorbent material, comprising compressing a slab of cellular polycarbodiimide foam of substantially closed cell construction, in a direction perpendicular to the slab, at a temperature below 120° C., and then releasing the pressure on the slab, said compression being performed to such an extent that, upon release of the pressure, the slab recovers its original thickness to the extent that its final thickness is 50 to 66% of its original thickness.

2. A method as claimed in claim 1, in which the slab is compressed to such an extent that it recovers to about 50% of its original thickness, said compression rupturing the walls of the cells of the foam throughout the thickness of the slab.

3. A method as claimed in claim 1, said compression being performed to an extent that the slab recovers to about 66% of its original thickness, the walls of the cells of the foam being ruptured on opposite sides of the slab and the middle of the slab having intact cells.

4. A method as claimed in claim 1, in which said polycarbodiimide foam is produced from a foaming mixture constituted by 100 parts by weight of methylphenyldiisocyanate, 4 to 6 parts by weight of diphenylcresyl phosphate and 4 to 6 parts by weight of dimerisation activator.

5. A method as claimed in claim 1, in which said polycarbodiimide foam is produced from a foaming mixture constituted by 100 parts by weight of methylphenyldiisocyanate, 4 to 6 parts by weight of a plasticizing agent, and 4 to 6 parts by weight of a dimerisation activator.

6. A sound-absorbent material produced by the method of claim 1.

* * * * *